Oct. 24, 1944. R. A. RATCLIFF 2,361,123
SEED HOPPER DEVICE
Filed Jan. 15, 1942 2 Sheets-Sheet 1
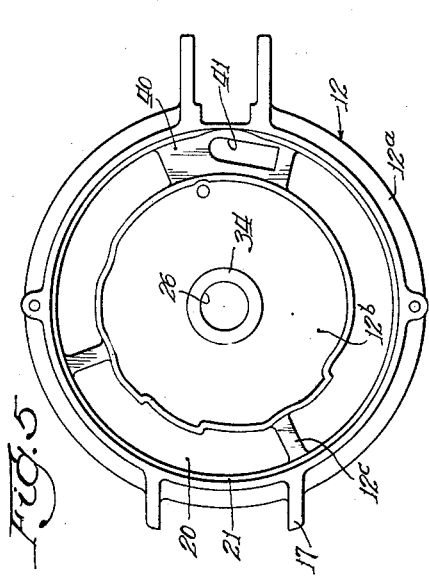
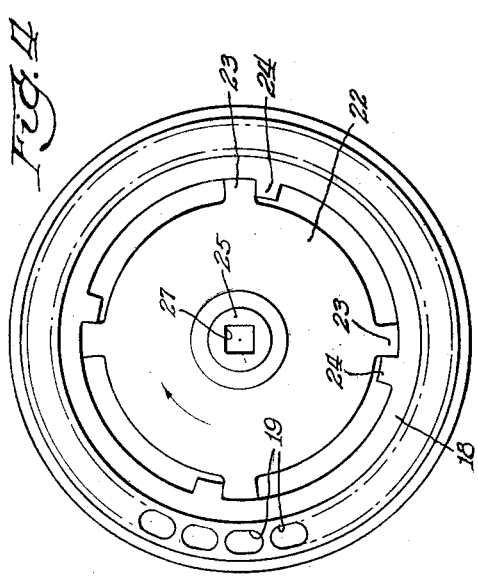
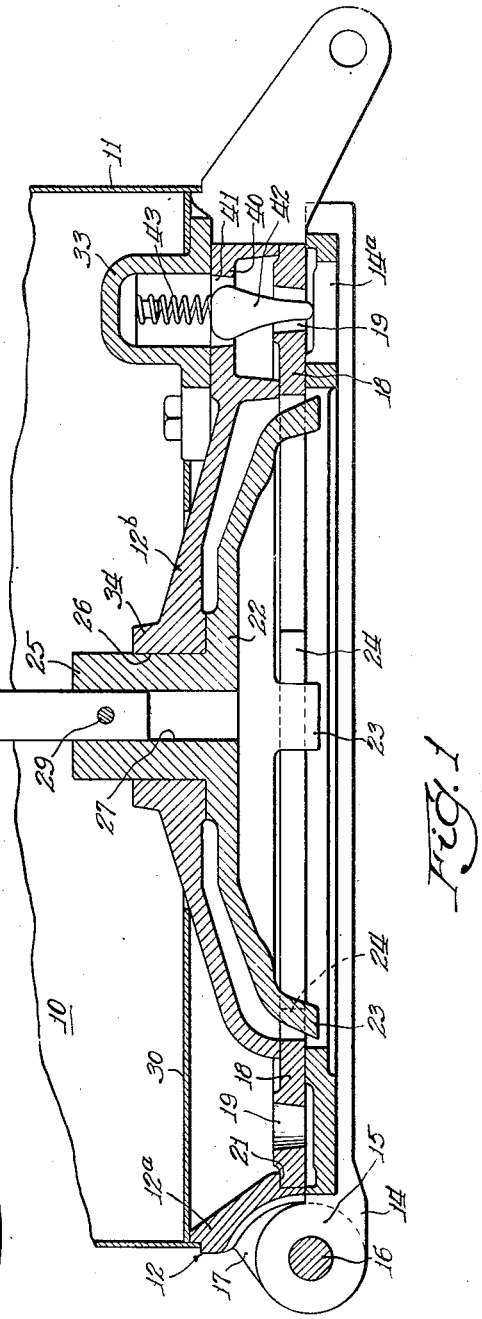
Inventor:
Ralph A. Ratcliff
By: Paul O. Pippel

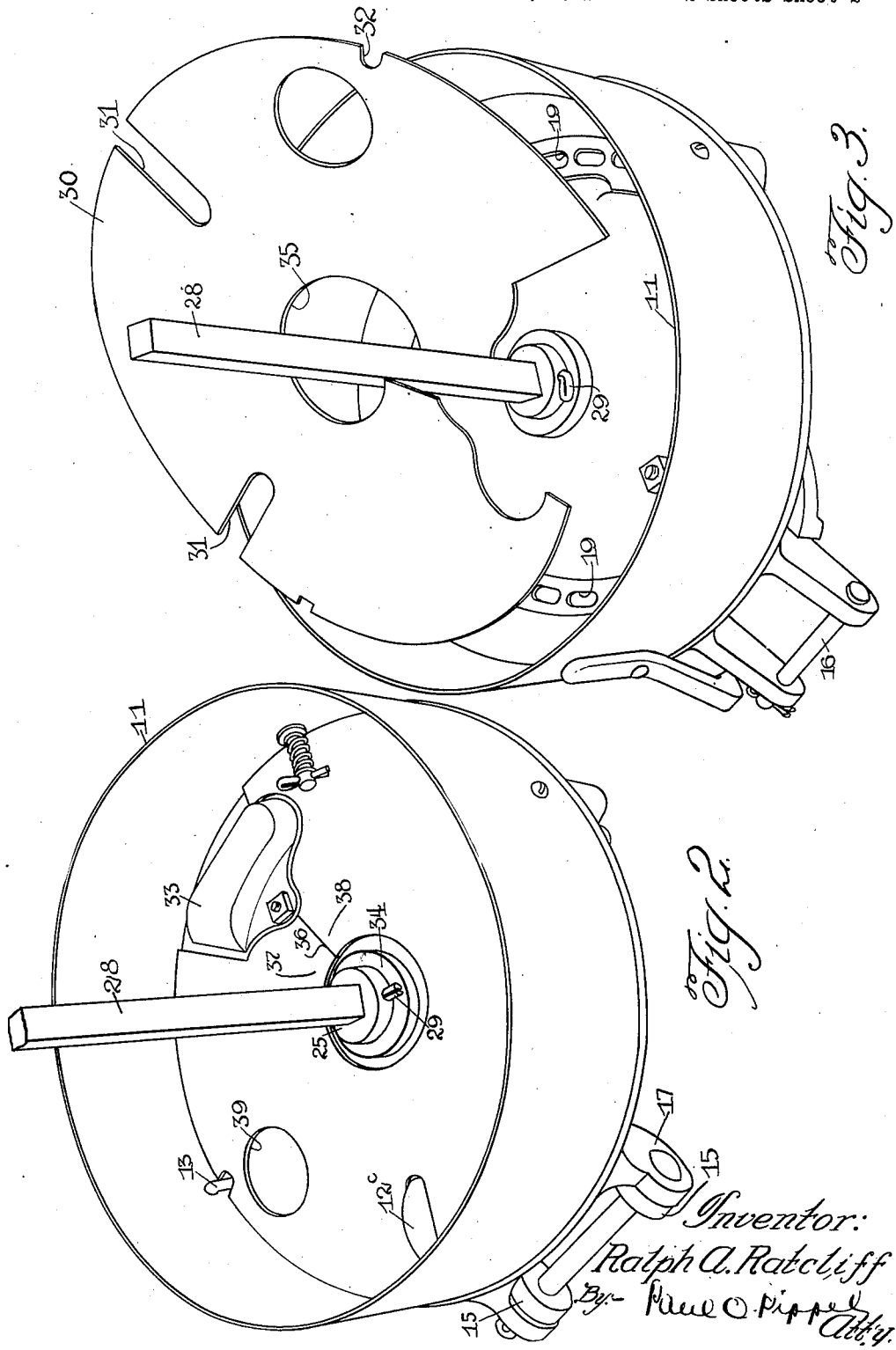

Patented Oct. 24, 1944

2,361,123

UNITED STATES PATENT OFFICE 2,361,123

SEED HOPPER DEVICE

Ralph A. Ratcliff, Canton, Ill., assignor to International Harvester Company, a corporation of New Jersey Application January 15, 1942, Serial No. 426,794

4 Claims. (Cl. 222—328)

This invention relates to seed hopper devices and more particularly to baffle means for controlling the movement of seed within a seed hopper device of a type having its driving means extending vertically within the hopper structure.

With seed hopper devices of the type shown in the patent to Benjamin et al. 1,899,931, where there extends vertically and upwardly through the hopper casing a vertical driving shaft, there has been used a type of baffle plate, similar to that shown in the Wamhoff Patent 1,944,381, for providing a central chamber to which seeds were directed and from which they were caused to pass laterally through a vertically extending opening for delivery to the rotating seed plate. With the centrally extending driving type of hopper structure, such as shown in the Benjamin et al. patent, this central cylindrical chamber could not be readily removed without first disconnecting the drive of the hopper device. Furthermore, the central chamber was also provided with an annular ring which necessarily had to be welded to the vertically extending cylinder and also used to keep the seeds from entering the annular chamber other than through the opening in the vertically extending cylinder.

It is the principal object of the present invention to provide an improved form of baffle means and seed hopper structures of a type having a vertically extending driving means, wherein the seed hopper device need not be completely disassembled for the insertion into the same of a baffle means.

It is another object of the invention to provide a baffle plate for seed hoppers which is of simple construction, easy to form, and less costly to farmers.

According to the present invention, a baffle plate, which is flat and easily formed, is inserted into the seed hopper casing and allowed to rest on the bottom of the same and above an annular opening provided in one of its base plates. This baffle substantially closes the bottom of the casing except for one opening through which the seeds may pass for delivery to the annular chamber in the base plate. Running within the annular chamber is the seed plate, and seeds passing through the opening in the baffle plate will be received by the seed plate and delivered to the proper opening where the same is emitted from the seed hopper device. By having this baffle plate so formed, smaller size seeds are not so readily sifted into the annular opening. The baffle plate is also particularly adapted for use with seed hopper devices of the type having a central operating shaft and thus has a central opening so as to fit the baffle plate about the shaft. Extending from this central opening is a slit whereby the plate can be readily disassembled from the hopper device and easily assembled within the same by mere edgewise displacement of the baffle plate. The plate is also relieved at different locations in order to fit over vertically extending projections extending upwardly from the base of the hopper device, one of such projections being the cut-off and kick-out mechanism housing. It is at the relieved opening in the baffle plate, which fits over this housing, that the slit in the baffle plate extends to form the central opening. By having the slit in this location, the portions of the plate are more readily buckled to fit the same over the driving shaft.

For a better understanding of the invention reference may be had to the following detailed description taken in connection with the accompanying drawings, in which:

Figure 1 is an enlarged sectional view in elevation through the seed hopper device;

Figure 2 is a perspective view showing the baffle plate in place;

Figure 3 is a perspective view of the bottom of the hopper structure and illustrating the method of inserting the baffle plate over the vertically extending drive shaft;

Figure 4 is a plan view of the mechanism shown in Figure 1, with certain parts removed, and illustrating the manner in which the seed plate is driven, and Figure 5 is a view from below showing the upper base plate.

Referring now particularly to Figure 1, there is shown a seed hopper device indicated generally at 10 having a seed hopper casing 11 which is supported and secured to an upper base plate 12 by fastening means 13 (see Fig. 2). This base plate 12 is hinged to a lower base plate 14 by means of its projections 15 and a hinge bolt 16 extending between projections 17 on the lower base plate 14. Both of these base plates are then in turn supported on a supporting structure for a seed hopper device in a manner well-known in the art and by a structure not shown in the drawings. It should thus be apparent that the upper base plate 12 with the seed hopper casing 11 can be readily hinged upwardly with respect to the lower base plate 14. Resting on the lower base plate 14 is the usual seed plate 18 having the usual seed openings 19 circumferentially spaced around the same. This seed plate 18 is adapted to be rotated on the main base plate 14, whereby seeds which are dispensed from the seed hopper casing are delivered to an opening 14a in the lower base plate 14 through which they are ejected for delivery to the seed tube and to the previously prepared seed furrow in the ground in a manner to be presently described.

The upper base plate 12 is provided with an annular opening 20 immediately above the seed plate 18. The upper base plate 12 is also provided with an annular recess 21 in which the seed plate is nested and permitted to travel.

The upper base plate 12 consists generally of an outer ring portion 12a and an inner ring portion 12b (see Figs. 1 and 5). These two portions 12a and 12b are connected together by the usual radially extending spider web portions 12c and are thus held rigid with respect to each other. These spider web portions 12c extend across the annular opening 20, but due to being so small and bulged upwardly intermediate their length there is little interference of the flow of seed within the annular hopper.

The inner ring portion 12b of the upper base plate 12 is bowed upwardly and encloses a driving gear plate 22 which has at its lower end circumferentially spaced projections 23 adapted to engage with radially inwardly extending flange portions 24 of the seed plate 18 (see Figs. 1 and 4). This driving plate 22 has a hollow axle portion 25 which extends upwardly through an opening 26 in the inner ring portion of the upper base plate 12. This axle portion 25 has a squared opening 27 adapted to receive a squared shaft 28 to which it is fastened against axial movement therein by means of a cotter pin 29. This driving shaft 28 extends upwardly to a location externally of the upper part of the hopper casing where it is connected to other driving means provided on the tractor or planter frame adequately arranged for the driving of this shaft 28.

It has been common, as mentioned above, to provide a baffle construction in order to prevent the delivery of all of the seed to the annular opening 20 in the upper base plate 12 at one time, where it so happens the small seed would have been given otherwise preference to the larger seed as they are more easily sifted downwardly and thus be separated from the larger seed. But this prior baffle construction has taken the form of a centrally disposed cylinder having a vertically extending opening through which the seed would pass radially outwardly for delivery to the annuuar opening 20. Such a baffle construction took up considerable space and thus limited the number of seeds which could be inserted into the hopper case and as well could not be readily disassembled from the hopper because of interference with the shaft 28.

Coming now to a particular feature of the invention, there has been provided a baffle plate 30 which is of flat construction and which can be readily fitted about the shaft 28 as illustrated particularly well in Figure 3 without requiring the disassembling of the shaft 28 from the hopper structure. This baffle plate has relieved slots 31 adapted to fit over the upwardly extending spider web portions 12c when the plate 30 is in its final position, as shown in Figure 2. There is also provided a slot 32 in its outer edge so that the plate also can be fitted over the fastening means 13.

Extending also upwardly from the plate 12 and carried thereby is a housing 33 for the cut-off and kick-out parts which forms the largest of the vertically extending parts on the plate 12.

The baffle plate 30 is thus relieved considerably in order to fit about this housing 33. When the plate is in its finally seated position, the same will rest on the outer ring portion 12a of the upper base plate 12 and will completely cover the bottom of the housing.

In order to make it possible for the baffle plate 30 to be fitted about the shaft 28 and over an axle portion 34 of the inner ring 12b, there is provided a central opening 35 and from this central opening extends a slit 36 which connects with the relieved opening in the baffle plate which surrounds the housing 33. This slit 36 is made in this portion of the baffle plate so that it need not extend the full radial distance of the baffle plate and in order that there can be provided relatively narrow portions 37 and 38 which are more easily flexed for insertion of the baffle plate over the shaft 28, as is done on the assembly of the baffle plate 30 within the seed hopper casing.

With this baffle plate in its proper position, the weight of the seed is nearly all retained upon the baffle plate 30 and is delivered in limited amounts through an opening 39 in alinement with the annular opening 20 in the upper base plate 12. From this opening 39 the seed is picked up by the seed plate 18 and carried to the cut-off and kick-out mechanism within the housing 33 where the same is ejected from the seed hopper structure.

As shown in Figures 1, 2, and 5, plate 12 is provided, in addition to the web portions 12c, with an elongated connecting portion 40 having an opening 41 therein to receive a kick-out pin 42 urged downwardly by a spring 43 attached to housing 33. As seed plate 18 rotates, pin 42 drops into the successive openings 19 and ejects seed into the opening 14a, from which it is carried through conventional seed spouts, not shown, to a prepared seed bed.

It should now be apparent that there has been provided for use with a seed hopper device of a type having a vertically extending driving shaft a baffle plate which can be readily assembled within the device and removed from the same without disconnecting of the central driving shaft from the hopper device. It should also be apparent that this baffle plate is of such construction that it can be more easily made and will be of less cost to the farmer.

While various changes may be made in the detail construction, it shall be understood that such changes shall be within the spirit and scope of the present invention as defined by the appended claims.

What is claimed is:

1. In a seed hopper device, a seed hopper casing, a seed plate within the seed hopper adapted to be driven, a plate located above said seed plate and having an annular-shaped opening within which seeds are received for delivery to the seed plate, driving mechanism for the seed plate including a shaft extending upwardly through said plate and within the seed hopper casing, a loosely fitting baffle plate covering said annular-shaped opening except for small opening through which only a limited number of seeds is passed at a time, said baffle plate having a central opening adapted to receive said shaft and having a slit extending from its central opening whereby said plate may be put in place about the shaft by edgewise displacement of the same within the seed hopper casing.

2. In a seed hopper device, a seed hopper casing, a seed plate within the seed hopper casing adapted to be driven, a base plate having an annular-shaped opening within which seeds are received for delivery to the seed plate, driving mechanism for the seed plate including a shaft extending upwardly through the seed hopper casing, a flat baffle plate fitting loosely about the shaft and over the base plate and having a small opening for the passage of seed to the annular opening in said base plate, said above mentioned base plate having upwardly extending projections which would normally interfere with the proper seating of said baffle plate, and said baffle plate being provided with openings to fit over the shaft and the upwardly extending projections.

3. In a seed hopper device, a seed hopper casing, a seed plate within the seed hopper casing adapted to be driven, a base plate having an annular-shaped opening within which seeds are received for delivery to the seed plate, driving mechanism for the seed plate including a shaft extending upwardly through the seed hopper casing, a flat baffle plate fitting loosely about the shaft and over the base plate and having a small opening for the passage of seed to the annular opening in said base plate, said above mentioned base plate having upwardly extending projections which would normally interfere with the proper seating of said baffle plate, and said baffle plate being provided with an opening through which the shaft may extend and with open-ended slots in its outer periphery whereby the same will fit over said upwardly extending projections, said baffle plate further having a slit extending between the shaft opening and one of said open-ended slots whereby the baffle plate may be disposed about the shaft by edgewise displacement of the same to its proper position above the base plate.

4. In a seed hopper device, a seed hopper casing, a seed plate at the base of the seed hopper casing, a base plate having an annular-shaped opening from which seeds are delivered to the base plate, said base plate having an upwardly extending projection formed of a housing for cut-off and kick-out mechanism generally shaped to be tapered radially inwardly, driving mechanism for the seed plate including vertically extending shaft extending upward within said seed hopper casing, a flat baffle plate fitting loosely about the shaft and over the base plate, said baffle plate having a small opening for the passage of seed to the annular opening in said base plate, a central opening to fit about the shaft and a radially inwardly tapered open-ended slotted opening to fit about the radially inwardly tapered housing, said baffle plate having a slit extending from the central opening to the inner end of the slotted opening thereby portions of the plate may be more easily flexed upon the plate being inserted into the seed hopper casing and about the vertically extending shaft.

RALPH A. RATCLIFF.